Jan. 1, 1952   D. P. BERNHEIM ET AL   2,580,507
LENS BLOCKING DEVICE
Filed Jan. 12, 1948   4 Sheets-Sheet 1

INVENTOR.
DANIEL P. BERNHEIM
CARL G. SILVERBERG
BY
Louis L. Gagnon
ATTORNEY

Jan. 1, 1952     D. P. BERNHEIM ET AL     2,580,507
LENS BLOCKING DEVICE
Filed Jan. 12, 1948     4 Sheets-Sheet 2
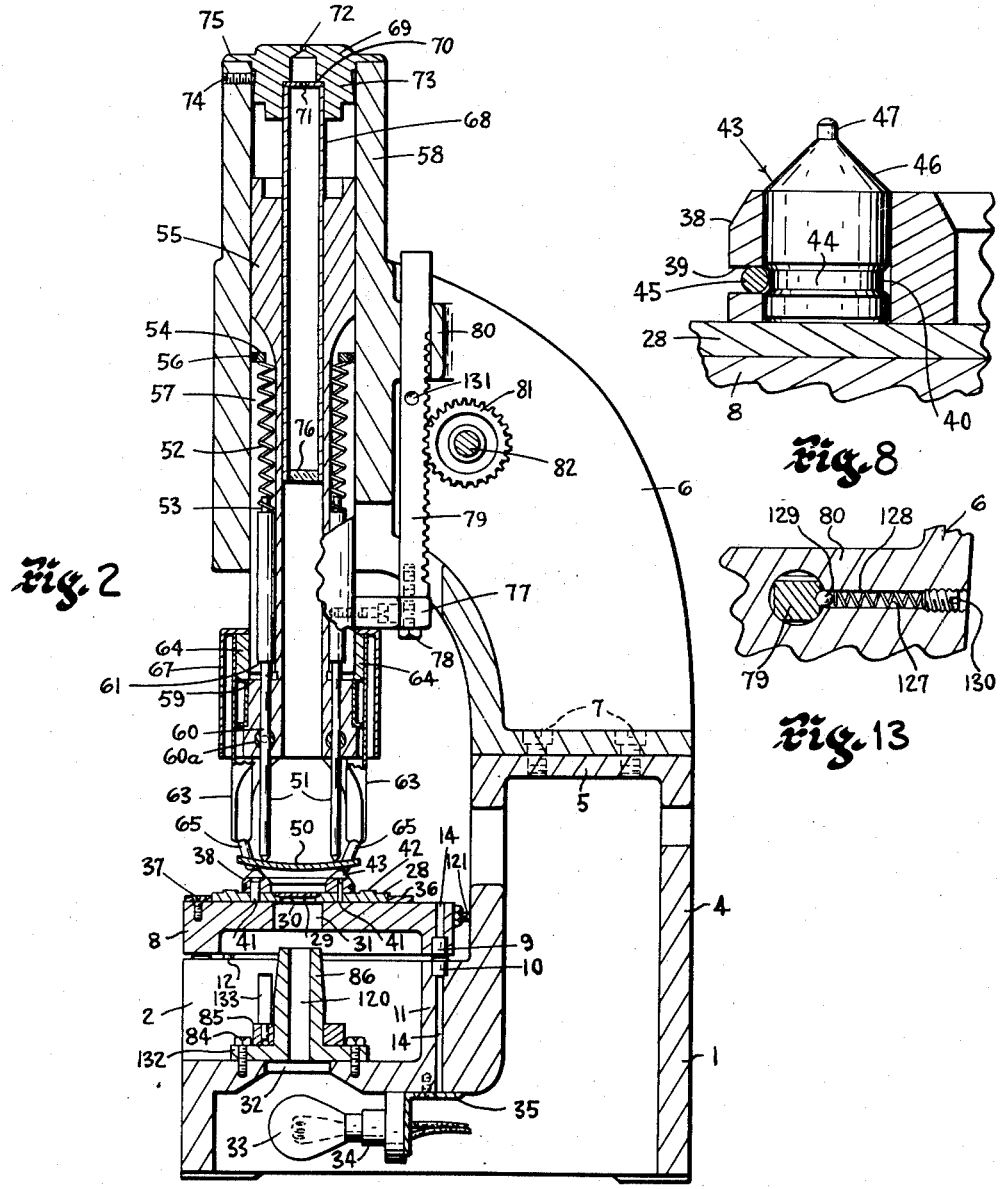
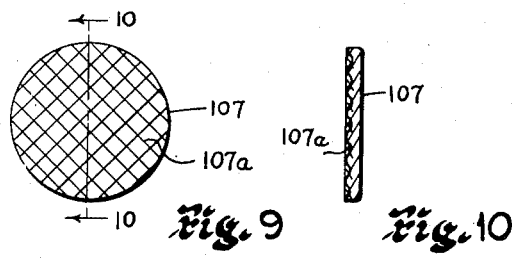
INVENTOR.
DANIEL P. BERNHEIM
CARL G. SILVERBERG
BY
Louis L. Gagnon
ATTORNEY Jan. 1, 1952     D. P. BERNHEIM ET AL     2,580,507
LENS BLOCKING DEVICE Filed Jan. 12, 1948     4 Sheets-Sheet 3

INVENTOR.
DANIEL P. BERNHEIM
CARL G. SILVERBERG
BY
Louis L. Gagnon
ATTORNEY

Jan. 1, 1952     D. P. BERNHEIM ET AL     2,580,507
LENS BLOCKING DEVICE
Filed Jan. 12, 1948     4 Sheets-Sheet 4
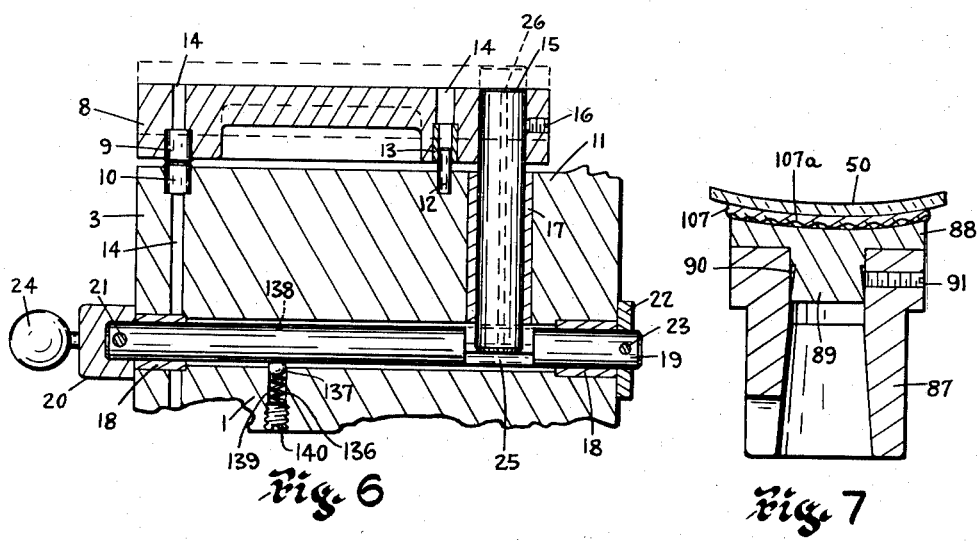
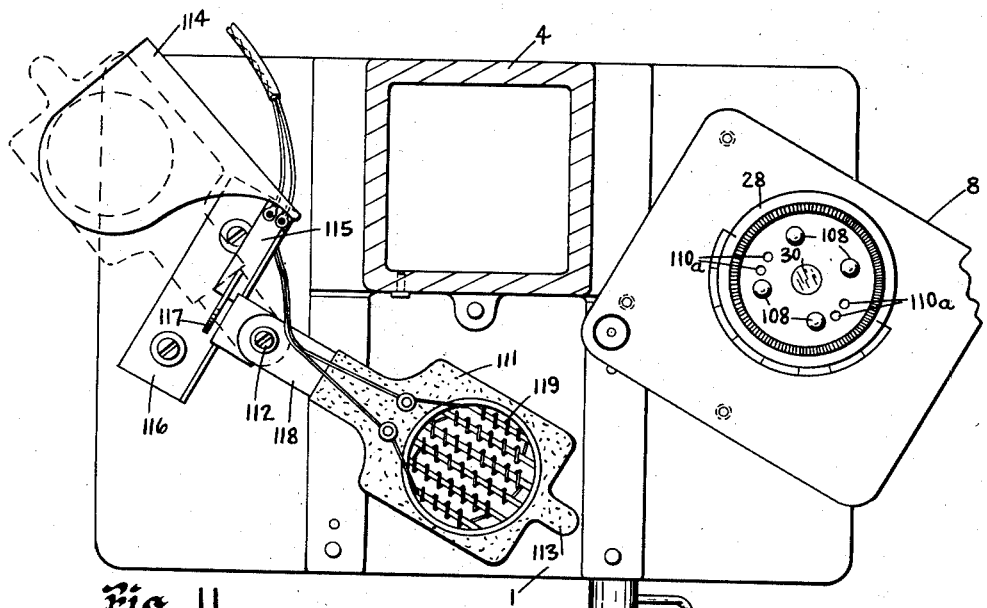
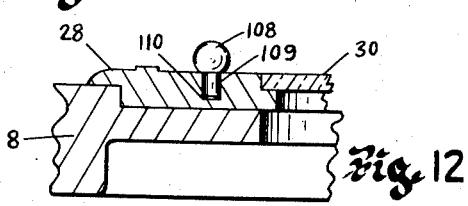

Patented Jan. 1, 1952

2,580,507

UNITED STATES PATENT OFFICE 2,580,507

LENS BLOCKING DEVICE

Daniel P. Bernheim, Southbridge, and Carl G. Silverberg, Sturbridge, Mass., assignors to American Optical Company, Southbridge, Mass., a voluntary association of Massachusetts Application January 12, 1948, Serial No. 1,744

18 Claims. (Cl. 51—277)

This invention relates to improvements in blocking devices and has particular reference to improved means and method of blocking lenses.

One of the principal objects of the invention is to provide improved means and method of blocking semi-finished lens blanks whereby the positional factors of the finished prescriptive power which the lens is to possess may be located prior to the blocking and the said lens blank blocked while held in said located position.

Another object of the invention is to provide improved means and method of blocking lenses whereby the prism and cylinder axes and extent of said prism may be located prior to blocking the semi-finished lens blank and the said lens blank blocked while held in said position.

Another object is to provide improved sighting and gripping means for semi-finished lens blanks whereby the optical characteristics which the finished lens is to possess may be predetermined and the said lens blank held by said gripping means in such a manner as to retain its position with respect to its prescriptive characteristics, whereby it may be transferred by a slight vertical movement into alignment with and be secured to a lens block while held in said position.

Another object is the provision of a movable heating element positioned for insertion between a lens blank and a lens block to simultaneously heat the adjacent surfaces thereof before securing the blank to the block.

Another object is to provide novel means and method of applying an adhesive to the adjoining surfaces of a lens blank and a lens block for securing said blank to said block.

Another object is the provision of an improved adhesive in the nature of a solid unit for securing a lens blank to a lens block and method of making the same.

Another object is to provide a device having means for supporting a lens blank, means for supporting a lens block on a vertical axis with said lens blank, an upright having sighting and gripping means vertically movable into and out of adjacent relation with the lens blank and adapted to position said lens blank with respect to said lens block.

Another object is to provide a device having means for positioning a lens blank with respect to the prescriptive characteristics which the finished lens is to possess, means for gripping and moving the lens blank vertically while held in said position, and means for returning the blank and attaching said blank to a lens block at substantially the same general location where it was originally positioned and gripped.

The invention also consists of new and original features of construction and combination of parts hereinafter set forth and claimed. Although the novel features are shown and described and are pointed out in the claims, the present invention will be more clearly understood and the advantages thereof fully realized from the following description read in conjunction with the accompanying drawings, in which:

Fig. 2 is a longitudinal sectional view taken on line 2—2 of Fig. 1 showing the sighting and gripping means for aligning a lens blank;

Fig. 6 is a fragmentary sectional view taken on line 6—6 of Fig. 1 showing the means for controlling the position of the lens blank supporting table;

Fig. 7 is a sectional view showing details of the construction of the lens block with a lens blank attached thereto;

Fig. 8 is a sectional view showing the means for locating lens supporting pin in the prism adjusting device;

Fig. 9 is a bottom plan view of a pitch pellet used as the adhesive for securing a lens blank to a lens block;

Fig. 10 is a sectional view of the pitch pellet taken on line 10—10 of Fig. 9;

Fig. 11 is a view similar to Fig. 3 showing a modified type of heating element and mounting thereof; and Fig. 12 is a fragmentary sectional view showing a modified form of prism adjustment means.

Fig. 13 is a sectional view taken through a portion of the supporting bracket and illustrating particularly the spring detent mechanism for retaining the sighting device in raised position.

Figure 1:
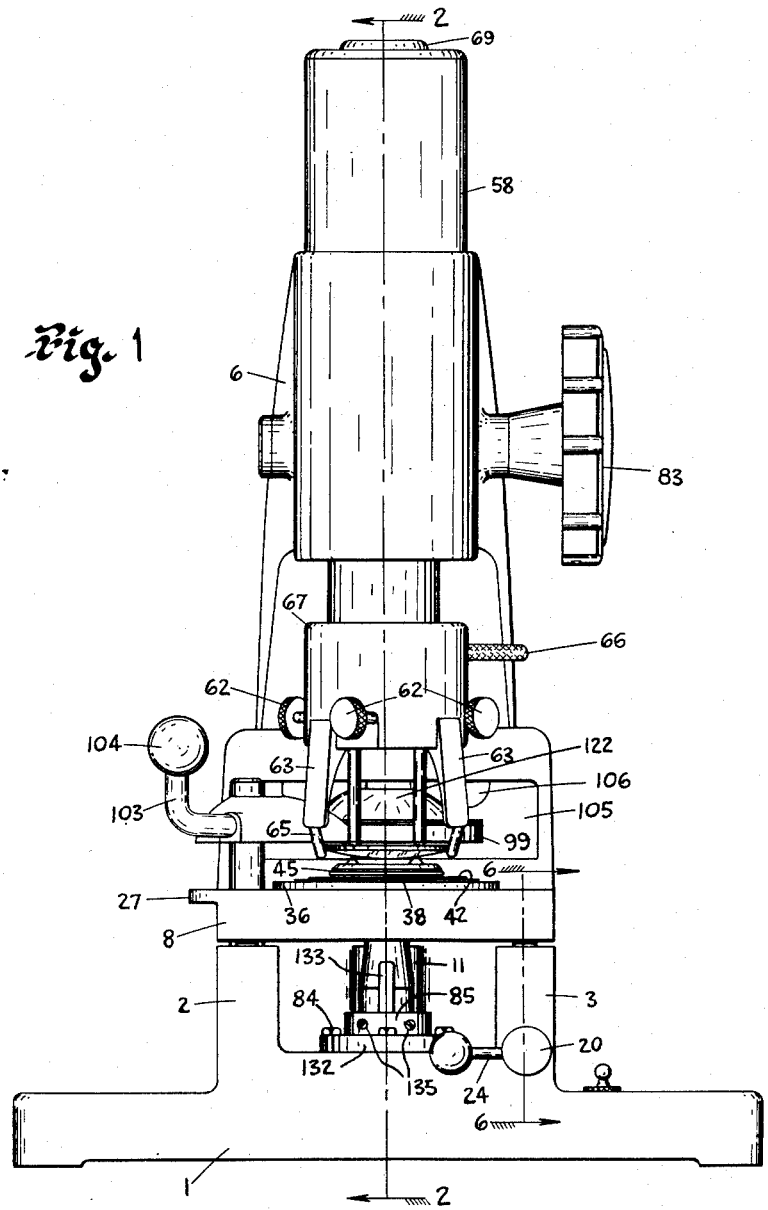
Fig. 1 is a front elevational view of a device embodying the invention.

When blocking a lens for the forming of the final prescriptive surface on said lens it is of extreme importance that the said lens be located in properly centered position and in instances wherein the said lens is to have a cylinder and prismatic correction embodied therein it is also of extreme importance that the axis of the cylinder and prism be located in the proper meridian and that the power thereof be accurately controlled.

An important feature of the present invention, therefore, is the provision of improved means and method whereby all of the positional and prescriptive characteristics which the resultant lens is to possess may be accurately determined prior to the final securing of the lens blank to the lens block so that the said lens blank will be held in proper position in the abrading machine employed to complete the final prescriptive surface on said blank.

A unique feature of the present device and method is that it eliminates all guesswork and insures that the accurate optical characteristics are being introduced during the final abrading of the prescriptive surface on the lens blank.

Although means and methods have been employed in the past for determining all the prescriptive components of a lens prior to the final positioning of the lens blank with respect to the lens block, it has been very difficult to provide suitable means for efficiently securing the lens blank to the lens block. One of the most satisfactory prior art devices was the type employing a pitch pot or kettle supported for positioning in alignment with the lens block to permit the flow of molten pitch from the kettle onto said lens block, the pitch having been previously rendered molten by heating means associated with the kettle. This process is, however, slow and messy and requires excessive handling of the lens blank by parts of the machine required to transfer the lens blank from sighting position to another section of the machine for securement to the lens block. This extra movement introduces an additional disadvantageous factor in that there is a possibility that the lens blank may be accidentally shifted from its position as initially located during the transfer to the lens block and thus be consequently inaccurately finished.

The present invention improves upon prior art devices by providing a removable table for locating the lens blank adjacent the sighting means, the table being provided with improved means for positioning the lens blank with respect to the amount of prism to be provided, and providing means for positioning a heating element between the lens blank and the lens block to which the blank is to be secured to heat the adjacent surfaces of the blank and the block simultaneously before application of an adhesive in the nature of a solid, whereby the lens blank will be fixedly secured to the lens block. With this construction there is also provided means for raising the lens blank vertically from the table and lowering the blank into contacting position with the lens block, the entire line of movement of the lens blank being always in a direction perpendicular to the surface of the lens blank supporting table.

This eliminates excessive movement of the lens blank after being positioned by the sighting device, and also eliminates the use of a kettle carrying a liquid adhesive, together with the accessories necessary for confining the liquid adhesive to the desired surfaces to be adhered, consequently resulting in an accurate positioning of the lens blank upon the lens block in a neat and efficient manner.

Referring more particularly to the drawings wherein like characters of reference designate like parts throughout the several views, the device embodying the invention comprises a hollow base 1 having spaced parallel transverse supports 2 and 3 thereon. Extending upwardly adjacent the rear ends of the supports 2 and 3 is a hollow upright 4 having a web 5 in the upper portion thereof adapted to carry a forwardly and upwardly extending supporting bracket 6, the bracket being fixedly secured to the web 5 by means such as screws or bolts 7.

Located in spanning relation to the forward portions of the spaced supports 2 and 3 is a movable table 8 provided on the underside thereof with a plurality of removable metal pads 9 (Figs. 2 and 6), each of which pads is adapted to make end to end contact with a corresponding aligned removable metal pad 10, the pads 10 being located in the upper surfaces of the supports 2 and 3 and in the upper surface of a protruding portion 11 of the front wall of the upright 4. The adjoining surfaces of the pads 9 and 10 are machined so that the upper surface of the table 8 will be located in a perfectly horizontal plane, it being possible to adjust this plane by grinding the ends of one or more of the pads 9 and 10. Locking pins 12 are fixedly located in the upper surfaces of the supports 2 and 3 and are adapted to removably engage bushings 13 located in the under side of the table 8, and serve to hold the table stationary. The table 8, supports 2 and 3, and upright portion 11 are provided with vertical openings 14 concentric with the inner ends of pads 9 and 10 and bushings 13 so that they may be easily knocked out for repair or replacement if desired.

Figure 3:
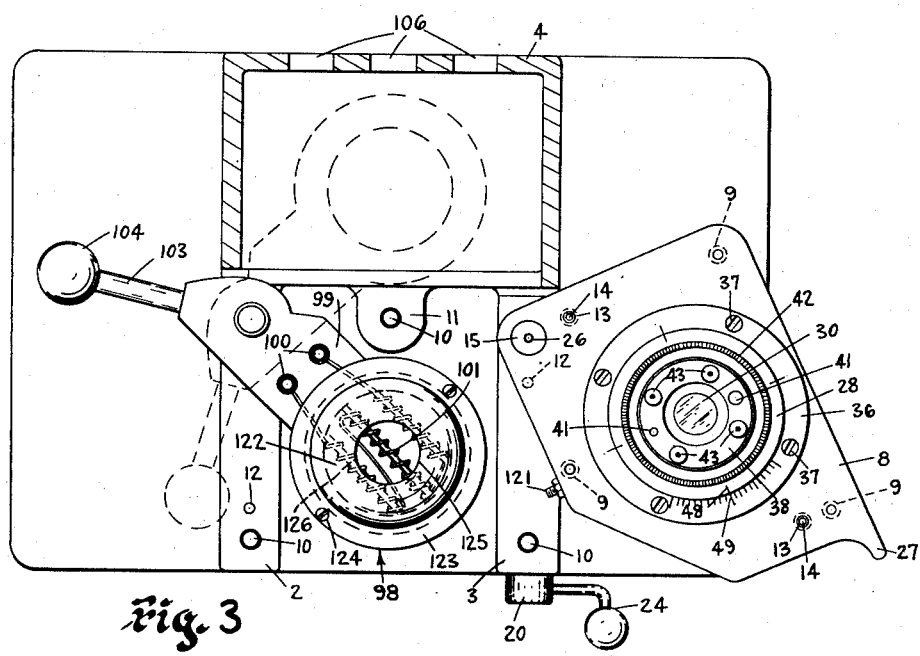
Fig. 3 is a plan view of said device partly in section with the sighting means removed to show the heating element and mounting therefor.

Manually operative means is provided for moving the table 8 and includes a vertical shaft 15 rotatably mounted throughout the major portion of its length in a fixed bushing 17 in the support 3 and having its upper end fixedly secured near the right rear corner of the table 8 and held in said fixed position by a set screw 16 or the like. Spaced bushings 18 are fixedly located in the front and rear ends of the support 3 and serve to rotatably support a transverse shaft 19, the forward end of which carries a hub 20 secured thereon by a pin 21, the rear end of shaft 19 having a washer 22 secured thereon by a pin 23 for retaining the shaft 19 in position. A handle 24 is secured to the hub 20 and serves to rotate the shaft 19, the shaft 19 being provided adjacent the point of contact by the lower end of the vertical shaft 15 with a cam portion 25, the cam portion being adapted to raise the shaft 15 when the handle 24 is operated to rotate shaft 19, and subsequently will lift the table 8 off the pins 12 as indicated in dotted outline in Fig. 6, permitting the table to be swung to one side about the axis of the shaft 15 to a position as shown in Fig. 3. The vertical shaft 15 is provided with a longitudinal bore 26 to permit the cam portion 25 of the shaft 19 to be lubricated, thus assuring easy operation of the device, and the table 8 is provided at the corner diagonally across from the shaft 15 with a short extension or handle portion 27 to be grasped by the operator for ease in moving the table.

The table 8 has rotatably mounted on the upper surface thereof a disc member 28 having a centrally located vertical opening 29 in which is fixedly secured a translucent member 30, the opening 29 being in vertical alignment with concentric openings 31 and 32 in the table 8 and base 1 respectively. Thus, light emanating from a source such as bulb 33 suitably located in the base 1 such as by socket 34 and bracket 35 can be seen through the translucent light diffusing member 30 (Fig. 2), the light being energized by any suitable source of current.

A retaining ring 36 is secured to the upper surface of the table 8 by means such as screws 37, the disc 28 being of such diameter as to snugly reside within the opening in the ring 36 and rotate therein. Fixedly secured to the upper surface of the disc 28 is a beveled ring member 38 having a groove or channel 39 (Fig. 8) formed in the periphery thereof, the member 38 being removably mounted on the disc 28 by means of pins 41, the pins 41 being fixedly mounted in the disc 28 and adapted to co-mate with vertical openings in the under side of the member 38. Thus the member 38 may be lifted off the pins 41 and disc 28 but in normal operation is adapted to reside against the surface of the disc 28 and to be rotated therewith. The upper surface of the disc 28 is provided with a knurled portion 42 whereby the disc 28 and member 38 may be easily rotated. The member 38 is provided with vertical openings 40 which are located adjacent the outer edge of the member 38 in such a manner that the channel 39 cuts into the side walls of the openings 40 to provide a passageway into said openings. Prism regulating pins 43 of varying lengths are adapted to be inserted into the openings 40. The pins are provided with a circumferential groove 44 in which a circular spring clip or ring 45, positioned in the channel 39, is adapted to removably retain the pins in the openings. Thus, the pins 45 may be lifted upwardly against the tension exerted by the clip or ring 45 to be replaced or the like, with the replacement pin inserted into the opening 40 and forced downwardly against the pressure exerted by the clip or ring 45 to become firmly seated in a manner as shown in Fig. 8. The upper end of each pin 43 is conically shaped as at 46, the apex thereof having a short upward extension or ball portion 47, a lens blank 50 to be blocked being adapted to be rested upon the portions 47 of the pins 43.

The disc 28 is provided with a plurality of location lines 48 which cooperatively function with a degree scale 49 marked on the retaining ring 36. The amount of the prism which is to be introduced in the lens blank 50, which lens blank is being supported by the ends of the pins 43, is determined by positioning pins 43 of the desired controlled lengths in the openings 40 in the member 38. By inserting pins of varying lengths it will be seen that the lens blank 50 will repose at varying angles, and by this means various amounts of prism may be introduced in the lens. The location lines 48 and degree scale 49 are for the purpose of locating the blank in the proper meridian according to the cylinder axis or prism axis desired in the finished lens. The center and the axis lines are previously marked on the lens blank following the usual procedure in the manufacture of ophthalmic lenses, and are used to accurately position the lens blank in the present device. In this manner the axis of the prism and cylinder may be positively located and the extent of prism may be introduced as well as accurate centering.

After the lens blank has been positioned, as stated above, a plurality of contact members 51 are moved directly into engagement with the upper surface of the lens blank 50. The contact members 51, as shown in Fig. 2, are independently urged toward the lens blank 50 by means of backing springs 52 which engage each of the contact members 51 at one end thereof, as indicated at 53, and at the opposite ends engage a split washer 54. The washer 54 is formed of two semi-circular shaped members which are adapted to be located in a circumferential groove in the sighting device body member 55 by means of a spring clip or wire 56, the upper ends of the backing springs 52 being adapted to engage the lower surface of the washer 54. The body member 55 of the sighting device is vertically movable internally of a housing 58 carried by the supporting bracket 6 and is provided with a plurality of longitudinal grooves 57, as shown in Fig. 2. The contact members 51 and backing springs 52 are positioned within these grooves 57 with sufficient clearance so that the body member 55 and attached parts are free to reciprocate as a unit in the housing 58. The longitudinal grooves 57 terminate in shouldered edges 59 and communicate with a plurality of openings 60 in which the reduced portions of the contact members 51 are slidably mounted. The members 51 are each provided with a shouldered portion 61 which is adapted to engage the shouldered edge 59 of the grooves 57 and limit the downward movement of said members 51 under the reaction of the backing springs 52. The lower end of the body member 55 is provided with a plurality of transversely extending openings 60a directly intercepting the openings 60 in which the reduced portions of the contact members 51 are slidably mounted. Each of said latter openings is adapted to receive the shank of a knurled clamp screw 62, the ends of the shank being adapted to directly or indirectly engage the contact members 51 when the clamp screws 62 are operated by any suitable method which may be used for locking the contact members 51 against longitudinal movement in the openings 60.

The clamp screws 62 are also indirectly connected by means not shown with a plurality of downwardly extending spring fingers 63, which fingers are rigidly attached adjacent their upper ends to a ring member 64 pressed or otherwise fixedly secured about the body member 55 near the lower end thereof and have their lower ends provided with means such as heat resistant rubber tubing or other suitable means forming cushion grips 65 for engaging the edge of and for gripping the lens blank 50. The clamp screws 62 and spring fingers 63 are constructed and function in the same manner as shown in Patent No. 2,253,954 issued August 26, 1941, to Lloyd W. Goddu. It is believed sufficient to state that in the present invention a manually operable handle 66 (Fig. 1) protrudes from the casing 67 and is adapted to be moved transversely in a slotted opening in the casing 67 to rotate a cam mechanism, which cam mechanism controls the inward and outward oscillating movement of the spring fingers 63. When the clamp screws 62 are loosened the handle 66 may be moved within the confines of the slotted opening whereby the grips 65 of the spring fingers 63 are permitted to engage the edge of the lens blank 50, gripping the said blank through the inherent resiliency of the fingers and are held in gripping relation with the edge of the blank by tightening the clamp screws 62, which tightening operation simultaneously locks the contact members 51 against longitudinal movement in the openings 60.

The body member 55 is provided, as shown in Fig. 2, with a hollow bore in which is extended a sighting tube 68. This tube is secured to a cap member 69 and has a washer 70 located adjacent the upper end thereof, the washer being provided with a restricted opening 71 centrally thereof. The cap member 69 is similarly provided with a restricted opening 72 in axial alignment with the opening 71 and has a tapered portion 73 internally of the housing 58, the taper of the portion 73 being such that tightening of the screws 74 automatically cams the cap member 69 in a direction inwardly of the housing 58 and forces the flange portion 75 of said cap member 69 into binding relation with the upper edge surface of the housing 58. The lower end of the sighting tube 68 is provided with a transparent member 76 in the form of a disc having cross-hairs (not shown) thereon. The cross-hairs may be adjusted to an initial meridional position by loosening the binding screws 74 and rotating the cap member 69 and the point of intersection thereof is coaxial with the tube and provides means with which a marked center on the blank may be aligned by sighting through the openings 71 and 72. This accurately centers the lens blank.

The assemblage including the body member 55, contact members 51, spring fingers 63, and their cooperative parts, is slidably supported in the housing 58 and is constantly urged by gravity toward the lens supporting table 8. A rack supporting lug 77 is bolted or otherwise secured to the body member 55 at a point well below the lower end of the housing 53 and has connected thereto by screws 78 the lower end of a vertically extending toothed rack 79, the rack being slidably disposed through an opening in a boss 80 formed integral with the rear of the housing 53. A pinion gear 81 adapted to mesh with the rack 79 is fixedly secured to a shaft 82, the shaft being rotatably mounted in the bracket 6 and having an operating knob 83 secured to one end thereof. Thus, manual rotation of the knob 83 will cause vertical movement of the body member 55 and consequently of the contact members 51 and spring fingers 63, toward or away from the lens blank 50.

Means may be provided for holding the sighting device in its raised position. Such a device is illustrated in Fig. 13 and includes a coil spring 127 which is located in a transverse bore 128 in the supporting bracket 6 and is adapted to urge a ball member 129 positioned adjacent its outer end toward the rack 79. The bore 128 is threaded near its outer end for reception of a threaded stud 130, which stud serves to retain the spring within the bore 128. A small cavity or indentation 131 is formed in the side wall of the rack 79 where it may be engaged by the ball member 129 of the spring detent when the sighting device is in its raised position. When the ball member 129 engages the cavity 131 the action of the coil spring 127 will maintain the sighting device in its raised position. The sighting device may, however, be lowered by rotating the knob 83 to overcome the force exerted by the spring 127. Suitable means such as a coil spring connected to the sighting device and the bracket 6 may be used if desired to control or counterbalance the gravitational forces acting upon the sighting device.

In using this portion of the subject invention, the handle 66 is initially moved to spread the spring fingers 63 outwardly. The knob 83 is then manually rotated to lower the sleeve 57, and the contact members 51 are guided into engagement with the upper surface of the lens blank 50 positioned on the pin members 46. The said blank has been previously aligned as to center, its prism and cylinder axes, and the extent of prism, and during the locating of the contact members 51 said blank is preferably manually supported in desired aligned position on the pin members 46. The spring fingers 63 are now operated so that they will grip the contour edge of the lens blank 50. This is accomplished by moving the handle 66 to permit the spring fingers to resiliently engage the edge of the lens blank with the contact members 51 engaging the upper surface of the blank.

A check is then made by sighting through the sighting tube 68 to insure that the lens blank has not moved from its desired prelocated position. The clamp screws 62 are then tightened to simultaneously secure the spring fingers 63 in gripping relation with the edge of the lens blank 50 and to secure the contact members 51 against longitudinal movement. It is to be noted that the gripping ends 65 of the fingers 63 are angled inwardly so as to insure a positive grip with the edge of the lens blank. After positively locating the spring fingers 63 and contact members 51 by tightening the clamp screws 62 the knob 83 may be again rotated to raise the body member 55 and consequently lift the lens blank 50 off the pins 46.

After removing the lens 50 from the pin members 46 the machine operator will rotate the handle 24 to raise the table 8, as hereinbefore described, and by grasping the short extension 27 will swing the table on the axis of the vertical shaft 15 to a sidewise position substantially as shown in Fig. 3.

Located by bolts 84 on the base 1 in axial alignment with the sighting device is an upright which has a tapering support 86 thereon on which is fitted an adapter 87 holding a lens block 88. The upright is formed with a base portion 132 on which resides a ring member 85 which is adapted to rotate about the tapered support 86. A vertical locating pin 133 is fixedly positioned in the upper surface of the ring member 85 and is adapted to engage a slot 134 in the adapter 87. Thus by rotating the ring member 85 and pin 133 the adapter 87 may be located as desired, set screws 135 being provided to lock the ring member 85 in adjusted position. The adapter 87 has a recessed upper end (Fig. 7) in which is extended a shank 89 on the under side of the block 88, the shank 89 having a circumferential taper 90 which is adapted to be engaged by a plurality of set screws 91. The tapered portion 90 is such that the binding action of the set screws 91 moves the block 88 in a direction inwardly of the recess. The adapter 87 also has a tapered recess in its lower surface whereby it may be easily positioned on the tapered portion 86 of the upright in axial alignment with the disc member 28 and sighting device. It is to be understood that the upright may be permanently attached to the machine and is provided with a central opening axially aligned with the sighting tube 68 and openings 32 and 31 in the base 1 and table 8 respectively, the adapter 87 to be attached after removal of the table 8 from position directly above the upright.

Figure 4:
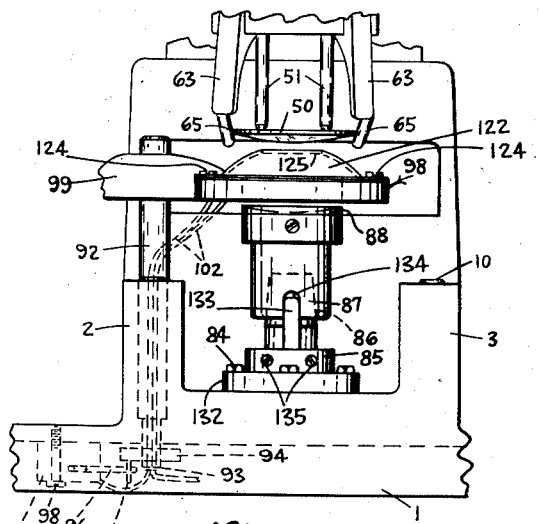
Fig. 4 is an enlarged fragmentary front elevational view showing the heating element in position for heating the lens blank and the lens block.
Figure 5:
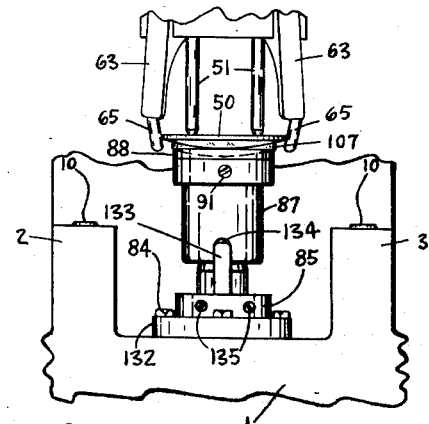
Fig. 5 is an enlarged fragmentary front elevational view showing the method of securing the lens blank to the lens block.

A vertical opening in the rear portion of the support 2 carries a shaft 92 (Fig. 4), the opening being of such size as to rotatably receive the shaft 92 and having an opening of smaller diameter extending from the lower end thereof adapted to receive an extension 93 on the lower end of the shaft 92. The extension 93 of the shaft 92 has secured thereto by a pin or other suitable means a collar 94 carrying an eccentrically located stud 95, the stud 95 being adapted to engage a leaf spring 96. The leaf spring 96 is the actuating member of a micro-switch 97, which switch is secured to the base 1 by means such as screws 98, and is adapted to be contacted by the stud 95 to open and close the switch 97 upon rotation of the shaft 92. The switch 97 is adapted to control the energic condition of a heating element 98 fixedly mounted on the rotatable shaft 92 adjacent the upper end thereof. Terminals 100 are provided in the nonconductive bracket portion 99 of the element 98 and have the coils 101 of the heating element connected thereto as well as the necessary wiring 102 between the coils 101, the micro-switch 97, and the source of current (not shown). A handle 103 carrying a knob 104 is adapted to be grasped by the operator to rotate the heating element 98 from its normal unheated position within a cavity or depression 105 formed in the upright 4, as shown by dotted outline in Fig. 3, to the position shown by solid lines in the same illustration, whereby the heating element will be disposed between the lens blank 50 and the lens block 88 as shown in Fig. 4. This rotation of the heating element 98 and consequently shaft 92 will cause the pin 95 to engage the leaf spring 96 to close the micro-switch 97, energizing the coils 101. The coils 101 will, upon being heated, thereby cause the adjacent lower surface of the lens blank 50 and the upper surface of the lens block 88 to become heated. After a pre-determined length of time the heating unit 98 may be manually returned to its normal position in the upright 4, by operation of knob 104, the rotation of the device causing the pin 95 to become disengaged from the leaf spring 96, opening the switch 97, and de-energizing the coils 101 of the heating element 98. A plurality of openings 106 are formed in the rear wall of the upright 4 to facilitate cooling of the heating element 98.

To increase the efficiency of this device it may be desired to use means located on the heating element such as a reflector 122 substantially cup shaped with a flange portion around the periphery thereof, the flanged portion being located adjacent the outer edge of the heating element 98 with a retaining ring 123 being positioned over the reflector in such a manner that means such as screws 124 can be used to secure the reflector to the heating element 98. The reflector 122 is provided centrally thereof with an opening 125, said opening being provided to lessen the amount of heat being projected upon the under surface of the lens blank 50, the reflector 122 also serving to reflect more heat downwardly to the lens block 88. Reducing the heat projected on the lens blank results in less breakage of lens blanks as might result from excessive heat being applied thereto. The complete time cycle is considerably reduced by deflecting additional heat downwardly on the lens block thereby adding to the efficiency of the device. The reflector 122 obviously protects the coils 101 of the heating element 98 and the quartz rods 126 on which the coils 101 are wound. Although the grips 65 of the spring fingers 63 holding the lens blank 50 are provided with heat resistant artificial rubber or similar cushioning means, the reflector will prevent a considerable amount of the heat from the heating element 98 from reaching the grips 65, thereby insuring longer life thereto. It is to be understood, however, that the heating device will function satisfactorily either with or without the reflector.

An adhesive preferably in the form of a solid pellet 107 (Figs. 9 and 10) of pitch or the like, is used for securing the lens blank to the lens block. The pellet 107 may be made of any of the commonly known heat-effective adhesive compositions used for this purpose and may be of a substantial disc shape, the composition being molded or otherwise made into solid form with a backing 107a of crinoline or other suitable coarse foraminous reinforcing material pressed into the pellet during the initial fabrication thereof and while the pellet is in a soft or pliable condition. Since pellets of this type are thin and may become broken during initial handling or when placed on the lens holder or block the backing provides means for retaining the broken pieces together and also serves to retard sidewise flow of the adhesive under the action of heat. Also, the fabric backing 107a will enable the lens blank to be much more easily removed eventually from a lens block.

In performing the operation of securing the lens blank to the lens block, the adhesive is placed upon the heated surface of the lens block 88, and the knob 83 is then rotated to bring the lens blank 50 downwardly so that the heated lower surface thereof will intimately press into contact with the pellet 107. The pellet will become at least partially molten due to the heat of the lens blank and lens block upon contact thereof. A lens blank 50 when in this position is constantly urged toward the pitch pellet 107 as described hereinbefore so that shrinkage due to the cooling of the pellet is compensated for. When the pellet has cooled sufficiently to secure the lens blank 50 to the block 88, the clamp screws 62 are loosened, whereupon the spring fingers 63 may be moved outwardly through manual operation of the handle 66. The fingers 63 and contact members 51, body member 55, and associated mechanism are then lifted in the housing 58 by manual operation of knob 83, and the adapter 87 together with the lens block 88 having the lens blank 50 secured thereto may be lifted off the upright 85.

It will be noted by reference to Figs. 11 and 12 that the introduction of prism in a lens blank may be accomplished by using ball members 108 provided with integral pin extensions 109 of varying lengths, the extensions adapted to reside in vertical openings 110 formed in the upper surface of the disc member 28. The amounts of prism to be introduced in a lens blank can be easily varied by employing ball members 108 with extensions 109 of lengths controlled according to the prism desired. Additional openings 110a are provided in which the ball members 108 may be located if desired, the openings 110 and 110a being spaced radially of and equidistant from the axis of the disc member 28. The purpose of providing these additional openings 110a is to enable the blocking of lenses which do not have a continuous surface thereon, such as, for example, bifocals wherein the segment portion of the bifocal is of a different curvature than the adjacent surface of the blank. By placing the ball members 108 in the proper openings 110a all of said members may be made to engage the surface of the blank adjacent to and at a location clear of the segment portion.

It will also be noted that the heating unit may be supported in various manners such as, for example, substantially as shown in Fig. 11 wherein the unit 111 is pivotally mounted at one end by means of a rotatable shaft 112 supported by the base 1. A handle 113 is formed integral with the outer end of the heating unit 111 so that the operator can grasp it to revolve the unit to a position as shown in dotted outline (Fig. 11) where it will reside in a metal housing 114. In this example a normally closed micro-switch 115 is positioned on a bracket 116 in such a manner that the switch feeler or actuating member 117 is adapted to be contacted and opened by the supporting arm 118 of the heating unit upon rotation of said unit to inoperative position. Removal of the arm 118 from engagement with the actuating member 117 when the unit is moved to operative position between the lens blank and lens block allows the switch 116 to close and thereby permits the heating element 119 to become heated as in the preferred construction.

The upright 85 for supporting the lens block adapter 87 is provided with a vertical opening 120 (Fig. 2) axially aligned with the base opening 32 and table opening 31 to permit illumination from lamp 33 to pass upwardly through the translucent light diffusing member 30 and to illuminate the lens blank 50. The lamp 33 is controlled by any suitable switch arrangement and may be positioned slightly out of alignment with the opening 32 and the member 30 for the purpose of providing indirect diffused light or may be directly in alignment therewith in order to provide the greatest illumination on the lens blank 50. If desired, suitable means may be provided for moving the lamp 33 into and out of alignment.

It is to be understood that the movable lens supporting table 8 may be provided with simple adjustable means for aligning the bushings 13 in the under side thereof with the pins 12 when returning the table 8 to its position in spanning relation to the supports 2 and 3 after a lens has been blocked and removed from the adapter 87, whereby the table 8 may be more quickly and easily positioned in axial alignment with the holding device for successive lens aligning operations. This may be accomplished by providing means such as the adjustable stop member 121 located in the rear edge of the table member 8 and adjustably positioned so that when the table 8 is swung to a position spanning the supports 2 and 3 it will abut the front surface of the upright 4 to position the table for proper disposition thereof upon the locking pins 12 without unnecessary "feeling" or "groping." Also, if desired, the mechanism for raising and lowering the lens supporting table 8 may be provided with a spring detent device for restraining the table from undesired vertical movement. Such a detent similar to the spring detent of the sighting device is illustrated in Fig. 6 wherein a coil spring 136 and ball member 137 cooperate with cavities or indentations 138 in the transverse shaft 19, the spring and ball being positioned in a vertical bore 139 in the base 1 and retained therein by a stud 140. Thus the shaft 19 may be rotated to raise or lower the table 8 and the detent will operate to maintain the table in either its uppermost or lower position until enough manual force is applied to the handle 24 to overcome the action of the spring 136 and thus permit the table to be moved vertically.

Although the heating unit has been described as being energized when moved to a position intermediate the block and supported lens blank, the heating unit may, if desired, be in the form of a ceramic element movable into and out of operative position in a manner similar to the heating unit illustrated in Fig. 3. In this instance, the heating unit could be located internally of the upright 4 and adapted to preheat or continuously heat the ceramic element so that when said element is moved in between the blank and block to heat the same, it will be preheated to the required temperature.

It is also to be understood that the table 8 may be provided with a base portion having a tapered bore adapted to fit over the tapered upright 86 for positional purposes and may be used either with or without the contact members 9 and 10.

From the foregoing description it will be seen that an invention of the character described is very definitely an improvement over the prior art by providing a machine with improved means for sighting and gripping semi-finished lens blanks for introducing desired optical characteristics which the finished lens is to possess, and the lens blank held by the improved gripping means in such a manner as to retain its position with respect to the prescriptive characteristics; also by providing neat and efficient means for securing a lens blank to a lens block by including a movable heating element adapted to heat the adjacent surfaces of the lens blank and lens block and insertion of an adhesive in the form of a solid of controlled size whereby the blank and block may be joined in a very satisfactory manner, in contrast to the messy means employed by prior art devices which are generally of a somewhat involved nature and which employ a pot carrying a molten adhesive and accessories necessary to confine the pitch to certain areas of the lens block to which the lens blank is to be attached. The present invention also improves upon the prior art by providing means for raising and lowering the lens blank in a vertical line of movement perpendicular to the surface of the table used for initially supporting the lens blank and by shortening the length of travel and confining the movement thereof during the blocking operation to said vertical line thereby eliminating to a great degree possible inaccuracies in blocking.

The advantages of our invention will be readily understood from the foregoing description and, while we have shown and described a preferred embodiment of our invention, it is evident that various modifications may be made that will come within the scope of the invention, and we do not desire, therefore, to limit ourselves to the exact form of construction shown and described herein.

Having described our invention, we claim:

1. In a device of the character described, the combination of a base, a holding device supported on said base, a table carried by said base having means for adjusting a lens blank to a predetermined position, said table being movable into and out of alignment with the holding device, said holding device having gripping means adapted to contact and retain said lens blank in adjusted position and being adapted to move said gripping means and said lens blank in a direction vertically toward or away from the plane of the table, lens block supporting means on said base in axial alignment with said holding device and adapted to support a lens block, and a heating device movably mounted on said base for movement in a direction transversely of the holding device and lens block supporting means into and out of position therebetween and being adapted to heat the adjacent surfaces of the lens blank and lens block when held by the respective holding device and supporting means.

2. In a device of the character described, the combination of a base, a table member adjustably mounted on said base for movement between a pair of stations and carrying contacts on which a lens blank is adapted to adjustably reside in a predetermined position, a holding device supported on said base in axial alignment with one of said stations and movable in a direction perpendicular to the direction in which said table member is adapted to be moved, said holding device having gripping means adapted to contact and retain said lens blank in adjusted position and being adapted to move said gripping means and said lens blank in a direction vertically toward or away from said station, lens block supporting means on said base in axial alignment with said holding device and adapted to support a lens block, a heating device adjustably mounted on said base and adapted to be moved into and out of operative position between the lens blank and the lens block and to heat the adjacent surfaces thereof.

3. In a device of the character described, the combination of a base having a support thereon provided with a member carrying contacts on which a lens blank is adapted to reside, said member and said contacts being adjustable to locate the lens blank in a predetermined position, a holding device supported on said base in axial alignment with said member carrying contacts and movable in a direction toward and away from said support, said holding device having gripping means adapted to contact and retain said lens blank in adjusted position and being adapted to move said gripping means and said lens blank in a direction vertically toward or away from the member carrying contacts, lens block supporting means on said base in axial alignment with said holding device and adapted to support a lens block, a heating device adjustably mounted on said base and adapted to be moved in a direction transversely of the lens block supporting means and holding device into and out of operative position between the holding device and the lens block supporting means to heat the adjacent surfaces of the lens blank and lens block when assembled with said holding device and supporting means.

4. In a device of the character described, the combination of a base, a table member mounted on said base, said table member being provided with a member carrying adjustable spaced contacts on which a lens blank is adapted to reside, said member being adjustable to locate the lens blank in accordance with its predetermined cylinder axis, said contacts being adjustable to provide angular displacement of the lens blank to introduce a predetermined amount of prism thereto, a holding device supported on said base in axial alignment above said table member and movable in a direction perpendicular to the surface of said table member, said holding device having gripping means adapted to contact and retain said lens blank in adjusted position and being adapted to move said gripping means and said lens blank in a direction vertically toward or away from the table member, lens block supporting means on said base in axial alignment below said table member and said holding device and adapted to support a lens block, a support member pivotally mounted on said base and having a portion adapted to be moved into and out of operative position between the lens blank holding device and the lens block supporting means, said portion having means thereon to heat the adjacent surfaces of a supported lens blank and lens block, and an adhesive member adapted to be applied to the heated surface of said lens block supported in said means whereupon the holding device may be moved toward the lens block to bring the supported lens blank into engagement with the lens block, the heat of the lens blank and the lens block acting upon the adhesive member to secure the lens blank to the lens block while the lens blank is retained in adjusted position.

5. In a device of the character described, the combination of a base having spaced supports thereon, a table member mounted for movement into and out of a position in spanning relation to said supports, said table member having a rotatable disc member located on the top surface thereof carrying a plurality of individually adjustable spaced contacts on which a lens blank is adapted to reside, said disc member being adjustable to locate the lens blank in accordance with its predetermined cylinder axis, said contacts being adjustable to provide angular displacement of the lens blank to introduce a predetermined amount of prism thereto, controlling mechanism for locating said table member in said position comprising a plurality of pin members located in said supports and adapted to co-mate with openings formed in the lower surface of said table member, and manually operable lifting means for raising said table from said pin members to permit the table to be moved from said position spanning the supports, a holding device supported on said base in axial alignment with said table when said table is located by said pins in said position, said holding device having gripping means adapted to contact the peripheral edges of a lens blank and releasably retain said lens blank in adjusted position and being adapted to move said gripping means and said retained lens blank in a direction vertically toward or away from the spaced supports, lens block supporting means on said base in axial alignment with said holding device and adapted to support a lens block in alignment with the lens blank, a heating device mounted on said base and having a portion adapted to be moved into and out of operative position between the holding device for lens blank and the lens block supporting means, said portion having means for heating the adjacent surfaces of the lens blank and block whereby an adhesive may be applied to the heated surface of said lens block and the holding device moved downwardly to bring the lens blank into engagement with said adhesive on the block, the heat of the lens blank and the lens block acting upon the adhesive to secure the lens blank to the lens block while the lens blank is retained in its adjusted position by the gripping means of the holding device, said gripping means being releasable to permit removal of the lens block and lens blank adhesively secured thereto in desired adjusted relation.

6. In a device of the character described, the combination of a base, a table member located on said base carrying spaced contacts on which a lens blank is adapted to adjustably reside in a predetermined position, sighting means supported on said base in axial alignment with said table member together with target means for aligning the optical axis of the lens blank therewith, a holding device having gripping means adapted to contact and retain said lens blank when in adjusted position, means for moving said holding device in a direction vertically toward or away from the adjusting means, lens block supporting means on said base in axial alignment with said target means and sighting means and adapted to support a lens block, a heating device mounted on said base and having a portion movable in directions transversely of the lens block supporting means and holding device into and out of operative position between the lens blank and the lens block, said portion having means to heat the adjacent surfaces of the lens blank and lens block whereby an adhesive may be applied to the heated surface of said lens block and said lens blank may be moved by the holding device into engagement therewith, the heat of the lens blank and the lens block acting upon the adhesive to secure the lens blank to the lens block while the lens blank is retained in adjusted position, and said gripping means being releasable to permit removal of the lens block with the lens blank adhered thereto.

7. In a device of the character described, the combination of a base, adjusting means on said base for supporting a lens blank in a predetermined position, a holding device supported on said base having gripping means adapted to contact and retain said lens blank in a position to which it has been adjusted and being adapted to move said gripping means and said retained lens blank in a direction toward or away from the adjusting means, lens block supporting means on said base in axial alignment with said holding device and adapted to support a lens block, a shaft rotatably mounted on said base, a support adapted to be moved by rotation of said shaft into and out of operative position between the holding device and the lens block supporting means, said support having a heating element adapted to be energized by suitable electric current, and a switch located in a position to be contacted upon rotation of said shaft, whereby upon movement of the support into operative position between the holding device, and lens block supporting means said switch will cause said heating element to be energized and upon movement of said support out of operative position said switch will deenergize said heating element.

8. In a device of the character described, the combination of a base, adjusting means on said base for adjusting a lens blank to a predetermined position, a holding device supported on said base having gripping means adapted to contact and retain said lens blank when in an adjusted position and being adapted to move said gripping means and said retained lens blank in a direction toward or away from the adjusting means, lens block supporting means on said base in axial alignment with said adjusting means and said holding device and adapted to support a lens block, a heating device adapted to be moved into and out of operative position between the lens blank and the lens block and to heat the adjacent surfaces thereof, said device embodying a heating element having coils adapted to be energized by suitable electric current, a reflector located on the heating element to be between the element and said lens blank when the device is in said operative position and having means associated therewith for controlling the heat projected upon the lens blank and for reflecting an additional amount of heat to said lens block, and a rotatable shaft supporting said heating device upon said base, said shaft being rotatable to move the heating device into and out of said operative position, and a switch located in a position to be contacted upon rotation of said shaft, whereby upon movement of the heating device into operative position between the holding device and lens block supporting means said switch will be contacted to cause said heating element to be energized and movement of said device out of operative position will operate to release said switch to de-energize said heating element.

9. In a device of the character described, the combination of a base having adjusting means on which a lens blank is adapted to adjustably reside in a predetermined position, a holding device supported on said base in axial alignment with said adjusting means, said holding device having gripping means adapted to contact and retain said lens blank when in an adjusted position and being adapted to vertically move said gripping means and said lens blank in a direction toward or away from the adjusting means, lens block supporting means on said base in axial alignment with said adjusting means and said holding device and adapted to support a removable lens block, a heating device mounted on said base for movement in directions transversely of the holding device and lens block supporting means into and out of operative position between the lens blank and the lens block and having means to heat the adjacent surfaces of the lens blank and lens block when supported, and an adhesive in the form of a solid adapted to be applied to the heated surface of said lens block, and means for moving said holding device to bring the heated surface of said lens blank into engagement with the adhesive on the lens block while the lens blank is held in adjusted position so as to secure the blank to the block while retained in said position, and said gripping means being releasable to permit removal of the lens block with the lens blank adhered thereto.

10. In a device for locating a lens blank, the combination of a base having spaced supports thereon, a table member adapted to operatively reside in spanning relation to said supports, manually operable means for controlling the location of said table member comprising a supporting shaft to which the table member is fixedly secured, said supporting shaft being rotatably mounted in one of said supports, and an operating shaft adapted to control the vertical position of said supporting shaft to raise or lower said table member, and lens blank positioning means carried by said table member comprising a rotatable member provided with a plurality of contacts of controlled different heights on which the lens blank to be located is adapted to reside, whereby rotation of the lens blank positioning means will function to locate the lens blank with respect to certain optical characteristics to be introduced therein.

11. In a lens blocking device, means for securing a lens blank to a lens block comprise a solid pellet of heat softenable adhesive material, and a backing of coarse open-mesh bonding material imbedded in a surface thereof.

12. In a lens blocking device, means for securing a lens blank to a lens block comprising a solid adhesive pellet of a substantially hard brittle nature when not subjected to heat, said adhesive having a coarse open-mesh bonding material imbedded in a surface thereof and adapted, when said pellet is broken, to retain the pieces thereof in substantially their original relations to one another, said pellet, including broken pieces thereof, being adapted to become molten and to flow into a single molten mass when subjected to heat.

13. A device of the character described comprising the combination of means for adjusting and supporting a lens blank in a given position, means for supporting a lens block in alignment with said lens blank, one of said supports being movable towards the other, heat generating means movable into and out of a station located between said supporting means for the lens blank and for said block for heating the adjacent surfaces of said blank and block when assembled therewith whereby an adhesive of a controlled amount may be positioned between said blank and block so as to be softened by the heat of said blank and block, and means for moving said movable support so as to bring the blank and block into engagement with the adhesive while retaining said blank in said adjusted and supported position.

14. In a lens blocking device, the combination of a lens block support, a support for maintaining a lens in alignment with said lens block support, a table mounted for movement into and out of position between the lens block support and the lens support, adjusting means on said table for locating a lens in a given determinable relation to the lens block to be supported in the lens block support, a heating element movable into and out of a station located between the lens block support and the lens support, and means for moving one of said supports toward and away from the other.

15. In a lens blocking device, a lens block support, means for supporting a lens in alignment above said lens block support, said means being adapted to move the lens in a direction toward and away from the lens block support, a table mounted for movement into and out of a station located between the lens block support and the lens supporting means, adjusting means on said table for locating a lens in a given determinable relation to the lens block to be supported in the lens block support, and a heating element mounted on the device and movable into and out of said station located between the lens block support and the lens supporting means when the table is not at said station.

16. In a lens blocking device, the combination of a lens block support, a support for maintaining a lens in substantial alignment with said lens block support, a table mounted for movement into and out of a station located between the lens block support and the lens supporting means, adjusting means on said table for locating a lens in a given determinable relation to the lens block to be supported in the lens block support, and means for moving one of said supports toward the other to bring the lens and lens block into adjacent relation.

17. In a lens blocking device, the combination of a lens block support, a support for maintaining a lens in substantial alignment with said lens block support, adjusting means intermediate said lens block support and the lens support for locating a lens in a given determinable relation to the lens block to be supported in the lens block support, and a heating element movable into and out of a station located between the lens block support and the lens support.

18. In a lens blocking device, an adhesive member for securing a lens blank to a holder comprising a relatively thin, solid disc-like portion of heat-effective adhesive, said adhesive being of a relatively brittle nature when cold and adapted to flow when heated, said disc having a coarse reinforcing member of open-meshed material impressed in a surface thereof to maintain the portions of adhesive together when broken and to retard sidewise flow of the adhesive when heated.

DANIEL P. BERNHEIM.
CARL G. SILVERBERG.

REFERENCES CITED

The following references are of record in the file of this patent:

UNITED STATES PATENTS

| Number | Name | Date |
|---|---|---|
| Re. 18,569 | McCabe | Aug. 16, 1932 |
| 1,168,710 | Coleman | Jan. 18, 1916 |
| 1,261,766 | Challet | Apr. 9, 1918 |
| 1,332,778 | Taylor et al. | Mar. 2, 1920 |
| 1,456,673 | Dey | May 29, 1923 |
| 1,609,937 | Forrest | Dec. 7, 1926 |
| 1,906,050 | Desenberg | Apr. 25, 1933 |
| 2,031,380 | McCabe | Feb. 18, 1936 |
| 2,151,233 | Rowe | Mar. 21, 1939 |
| 2,253,954 | Goddu | Aug. 26, 1941 |
| 2,335,222 | Storch | Nov. 23, 1943 |
| 2,397,743 | Kaphan | Apr. 2, 1946 |